United States Patent [19]

Alderson et al.

[11] 4,304,745

[45] Dec. 8, 1981

[54] MANUFACTURE OF MULTICOLORED DETERGENT BARS

[75] Inventors: David A. Alderson, South Wirral; Raymond C. Stott, Wirral, both of England

[73] Assignee: Lever Brothers Company, New York, N.Y.

[21] Appl. No.: 135,813

[22] Filed: Mar. 31, 1980

[30] Foreign Application Priority Data

Apr. 6, 1979 [GB] United Kingdom ............... 12142/79

[51] Int. Cl.3 ............................................... B29F 3/12

[52] U.S. Cl. ...................................... 264/75; 252/134; 264/171; 264/245; 425/131.1; 425/197

[58] Field of Search ......................... 264/75, 171, 245; 425/131.1, 133.1, 197, 198; 252/134, 90, DIG. 16, 121, 122

[56] References Cited

U.S. PATENT DOCUMENTS 3,676,538 7/1972 Patterson ............................ 264/75

3,779,676 12/1973 Bernard ........................... 425/131.1

3,923,438 12/1975 Perla ............................... 425/131.1

4,162,288 7/1979 Hunt et al. ........................... 264/75

4,222,979 9/1980 Hunt et al. ........................... 264/75

FOREIGN PATENT DOCUMENTS 2233395 6/1974 France .

2345515 3/1977 France .

1387567 3/1975 United Kingdom .

*Primary Examiner*—Jeffery R. Thurlow

*Attorney, Agent, or Firm*—James J. Farrell; Melvin H. Kurtz

[57] ABSTRACT

Multi-colored detergent bars can be manufactured by extruding detergent material through a multi-apertured plate in a detergent plodder and injecting a visually distinctive liquid at the plate. The liquid is distributed throughout the detergent material in the form of striations as the material is compressed in the extrusion cone.

A specific form of external striping and the use of increased amounts of injected liquid can be achieved by having some of the apertures positioned peripherally on the plate. These apertures form 'walls' of extruded material which constrain the liquid into stripes.

The manufactured bar has a distinctive appearance because the external striations are wider than the internal striations.

6 Claims, 4 Drawing Figures

MANUFACTURE OF MULTICOLORED DETERGENT BARS

FIELD OF INVENTION

This invention relates to apparatus and methods for the injection of liquids into detergent masses for the formation of multicoloured detergent bars and to the detergent bars themselves. The invention describes the injection into a detergent mass of a liquid contrasting in visual appearance with the detergent material.

When a contrasting liquid is injected the resulting detergent bar has a multi-coloured appearance which may be described as striped, mottled or marbled, dependent on the subjective assessment.

In Applicants' UK Pat. No. 1 387 567 there is described and claimed method and apparatus for introducing liquids into detergent bars. In this previous disclosure the method of manufacturing detergent bars comprises the steps of passing a detergent mass through a multi-apertured plate to form rods, introducing a liquid between the rods in at least one position, compressing the rods inwardly to form a continuous mass having striations of the liquid therein, cutting the mass into billets and stamping the latter to form bars. The stamping will normally be performed to make the external striations parallel to the longest dimension of the bar. Alternatively the striations can parallel a short dimension or the stamping can be performed at an angle to give diagonal (skew) stamping. End-on (axial) stamping may be used for some products. Striations are also visible at the bar surface. The striations within the mass and at the surface are formed by migration of the liquid into the linear interstices between the rods as the rods are compressed. The apertures in the plate provide striations throughout the detergent bar.

GENERAL DESCRIPTION OF THE INVENTION

The present invention is an improvement in the previously disclosed method and provides a surface striping on the bars of consistent and striking appearance. The bars made by the previously disclosed process have a random distribution of surface striations which give an attractive bar appearance but which are not reproducible from bar to bar.

The improvement is achieved by modifying the multi-apertured plate to provide spaced apertures at its periphery which extend to the edge of the area through which the detergent mass passes. The presence of these peripheral apertures forms detergent rods which abut the side wall of the compression extrusion cone. These rods function as walls between which the injected liquid, which has migrated to the surface, is constrained to form stripes. The width and spacing of the stripes will be determined by the peripheral arcs between the peripheral apertures. Thus a proportion, usually a minor proportion, of the total number of apertures on the plate will be in the peripheral position. In general the total number of apertures will be in the range from about 15 to about 150, preferably at least about 30 to about 60 are present.

Preferably the peripheral apertures contact the edge of the extrusion area over a length of arc. While tangential contact between the aperture and the edge of the area may provide a barrier to the spread of liquid, dependent on the material properties and pressures, this form of barrier is not as efficient as a barrier formed by an aperture contacting the edge over a length.

The method is of particular value when a relatively large volume of liquid is injected. This requirement can occur with certain combinations of colours in the detergent mass and liquid. In order to obtain the desired contrast a relatively large volume of liquid will be injected. However only a portion of the liquid can be retained within the mass in the form of striations, the remainder migrates to the surface of the mass as it is compressed and forms a substantially continuous layer on the surface. Clearly the presence of a continuous layer on the final product will not provide an appearance consistent with the internal striping. Additionally the layer can give problems in processing and handling.

The process of the invention constrains the excess liquid in the form of regular external stripes. Preferably the peripheral apertures are substantially regularly spaced around the periphery of the area but the spacing can be designed to provide the desired external striping.

In the process the detergent mass itself acts as an active integer in achieving the desired benefit because it is formed into walls by the peripheral apertures, and this constrains movement of the liquid on the surface of the mass.

The detergent bars manufactured by the method of the invention are of distinctive visual appearance because the external striations are wider than the internal striations. The internal striations will become visible during washing and thus the bar user will appreciate the difference between the internal and external striations. The internal striations will approximate to lines having a small width because of their manner of formation. However the external striations, which may alternatively be termed stripes because of their width will be wider and usually have dimensions in the range from about 0.2 cms to about 1.5 cms. The width of the surface striations are not limited to these dimensions. The lower limit of surface striation width will be determined by the operating conditions.

The term detergent is used herein to include both soaps, i.e. alkali metal salts of long chain fatty acids and non-soap synthetic detergents, for example salts of alkyl sulphates, alkanyl sulphonates, alkane sulphonates and sulphonated long chain fatty acids. The detergent material may include additional ingredients, for example builders, fillers, bactericides, bleaches and perfumes, which improve the utility of the bar for, as examples, personal washing and fabric washing. There is no criticality in the detergent provided it together with optional ingredients, is extrudable.

PRIOR DISCLOSURES

UK Pat. No. 1 387 567, to which reference has already been made, contains a general disclosure of the method to which this invention relates. This disclosure is incorporated herein by reference.

There are other disclosures of manufacturing multicoloured detergent bars in the literature. Thus UK Pat. No. 1 494 278 (Colgate-Palmolive) describes addition of coloured liquid to the soap chips in the vacuum chamber of a detergent plodder. French Pat. No. 1 600 543 (Henkel) describes the introduction of a coloured liquid at the inner surface of the plodder cylinder while in UK Pat. No. 1 316 477 (Unilever) the liquid is injected into the compressed detergent material in the plodder cylinder.

Injection of liquid within the extrusion cone has been suggested in UK Pat. No. 1 437 323 (Procter & Gamble) and French Pat. No. 1 566 998 (Réunis). U.S. Pat. No. 3,676,538 (assigned Purex) proposes injection of liquid immediately before the apertured plate between the plodder cylinder and extrusion cone. U.S. Pat. No. 3,890,419 (assigned Armour-Dial) discloses liquid injection between the plodder cylinder and cone but there is no suggestion this method provides striations throughout the detergent mass, nor is there disclosure of apertures arranged in contact with the periphery. U.S. Pat. No. 4,127,372 (assigned Colgate-Palmolive) discloses liquid injection along a plane at a position between the plodder cylinder and cone. A baffle of some form is required in the cone if a marbled effect, i.e. linear striations, is required.

The disclosure in these prior publications do not remove the inventive merit in the present invention.

DRAWINGS

Diagrammatic drawings are provided to assist in the description of specific embodiments. These drawings contain:

FIG. 1 which is a longitudinal section through a detergent extrusion apparatus,

FIG. 2 is a view of the modified multi-apertured plate viewed in the direction of arrow II in FIG. 1, FIG. 3 is a view of a large face of a detergent bar of the invention, and FIG. 4 is a view in the direction of arrows IV of a section of the bar of FIG. 3.

DETAILED DESCRIPTION OF INVENTION

Figure 1:
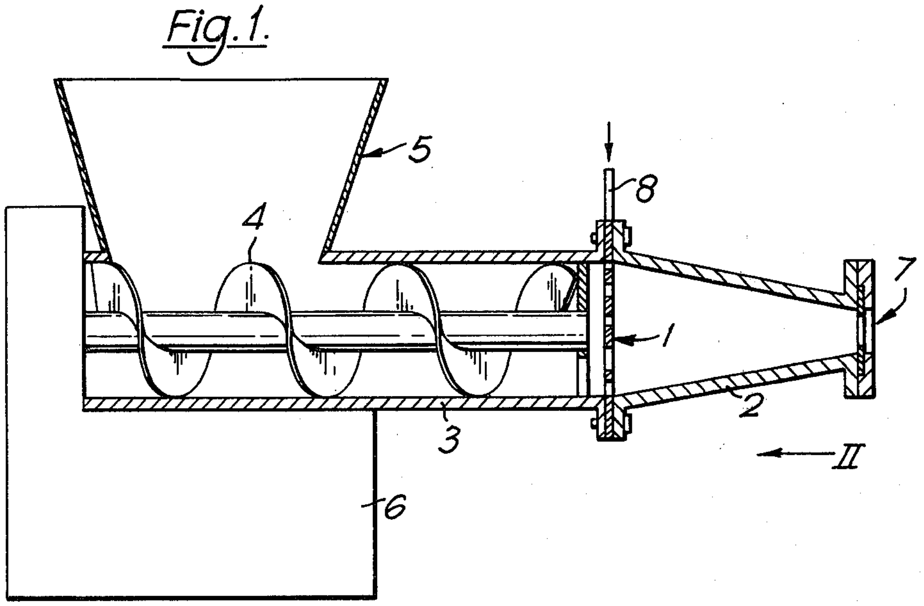

In FIG. 1 a multi-apertured plate 1 is positioned between extrusion cone 2 and plodder barrel 3. The cone forms a nozzle of decreasing sectional area so that rods of detergent extruded through the plate 1 by the action of plodder screw 4 are compressed. Detergent pieces, for example in the form of chips, noodles or flakes, are fed to screw 4 through hopper 5; the screw operates within barrel 3. The whole is supported on base 6. The detergent mass is extruded through plate 7 after passage through cone 2. A liquid having a visual appearance differing from the detergent mass is injected through conduit 8.

Figure 2:
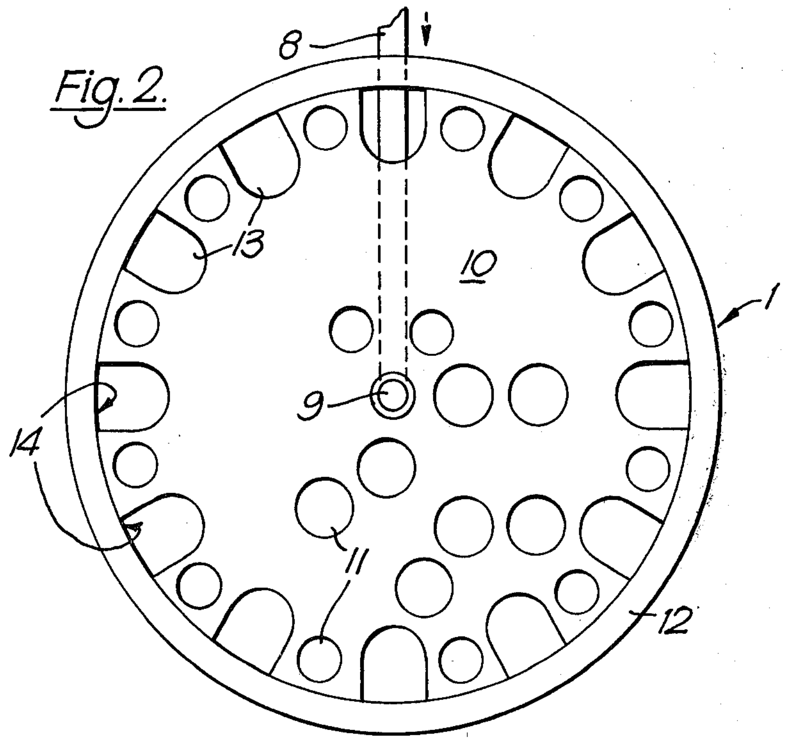

Conduit 8 (see FIG. 2) communicates with injection opening 9 centrally positioned within plate 1. The opening 9 opens at the downstream face of plate 1. The effect of introducing striations differing in appearance from the base material is also achieved if opening 9 projects a short distance, for example up to 10 cm, into the cone 2. Plate 1 comprises an area 10, which carries a pattern of apertures 11, and a ring 12. The ring 12 is adapted to allow the plate to be clamped between the barrel 3 and cone 2. Alternatively the plate can be positioned within the cone 2 but this embodiment would not require a ring 12. The apertures 11 are formed in a pattern over the area 10, for the sake of clarity not all apertures are shown. The pattern of apertures selected is at the discretion of the manufacturer.

On area 10 there are provided twelve peripheral apertures 13 the outer edges 14 of which are at the inner perimeter of ring 12. Thus when clamped in position the outer edges of apertures 13 form a continuous surface with the inner surfaces of the barrel 3 and cone 2. The outer edges 14 are therefore in contact with the edge of the extrusion area over a length of arc. The portions of the detergent mass passing through apertures 13 remain in contact with an inner surface of the apparatus while passing through cone 2.

In a manufacturing process a white soap base formed by the sodium salts of tallow and coconut derived fatty acids (80/20% by weight of the feedstock) was extruded through the apparatus of FIG. 1. A liquid containing a suspended blue/green colourant was injected through conduit 8 and aperture 9. The liquid had the composition (% by weight):

| | |
|---|---|
| water | 9.5 |
| glycerine | 83.0 |
| sodium carboxy methyl cellulose | 1.5 |
| Monastral blue BVS paste | 2.0 |
| Ansteads green 11125 | 4.0 |

Figure 3:
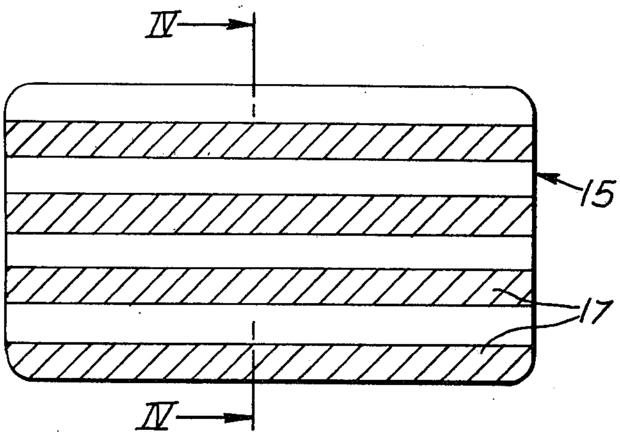
Figure 4:
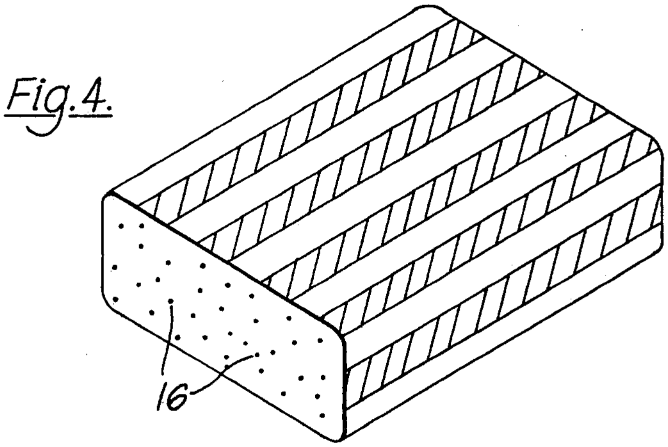

'Monastral' is a Registered Trade Mark. The amount of liquid injected was 800 g per 100 kg of soap. The extruded detergent was cut into billets and stamped to form bars. The resulting bars, which are seen in FIGS. 3 and 4, had blue/green striations 16 throughout the bar 15 and twelve well defined and contrasting stripes 17 on the surfaces.

The internal striations were in the form of thin lines and the external striations, or stripes, had a width of about 0.5 cms.

On increasing the amount of injected liquid to 1500 g per 100 kg the appearance was maintained. Using an unmodified plate 1, i.e. one with no peripheral apertures, the external surface of the extruded billet was almost completely covered with blue/green liquid.

The number of peripheral apertures will generally be in the range 4 to 30 but the number, size and spacing of the apertures will be dependant on the effect desired by the manufacture, the apparatus and feedstocks used.

The point or points of injection for the liquid may alternatively be within one or more apertures of the multi-apertured plate. In this embodiment, which is illustrated and described in UK Pat. No. 1 387 567, the point or points are carried by conduits extending into each aperture associated with an injection point.

The invention has been described with reference to a single stage plodder i.e. with one barrel and one aperture in the extrusion plate 7. The invention is applicable to twin screw plodders which have been modified by incorporating a partition in the cone so that each aperture in the final plate is associated with a single extrusion volume. This form of apparatus is described in French Pat. No. 2 345 515. The use of a single plodder to give two extruded billets, as described in UK Pat. No. 2 005 587, can also be modified in accordance with the present invention. A fourth process to which the present invention is applicable is that in which a twin plodder supplies a single cone and single apertured final plate.

In any application of the invention the extrusion aperture in the final plate must be associated with a single extrusion volume which is supplied by a multi-apertured area on the plate at which injection is made. The mass of extruded detergent mass should preferably not contact another extruded mass after liquid has been injected because the surface striping can be disrupted if contact is allowed.

What we claim is:

1. A method of manufacturing multi-coloured detergent bars wherein detergent material is extruded through a multi-apertured plate to form rods which are compacted inwardly as they pass through an extrusion cone, and a liquid differing in visual appearance to the detergent material is injected through at least one point within or immediately downstream of the multi-apertured plate, characterised in that the multi-apertured plate is provided with spaced apertures at its periphery which extend to the edge of the area through which the detergent material passes.

2. A method according to claim 1 wherein the peripheral apertures contact the edge of the extrusion area over a length.

3. A method according to claim 1 or 2 wherein the peripheral apertures are substantially regularly spaced around the periphery of the area.

4. A detergent plodder comprising extrusion means for extruding detergent material through a multi-apertured plate and an extrusion cone of decreasing sectional area positioned downstream of the plate and at least one liquid injection means positioned within or immediately downstream of the multi-apertured plate, characterised in that the multi-apertured plate is provided with spaced apertures at its periphery which extend to the edge of the area through which the detergent material passes.

5. A detergent plodder according to claim 4 wherein the peripheral apertures contact the edge of the extrusion area over a length.

6. A detergent plodder according to claim 4 or 5 wherein the peripheral apertures are substantially regularly spaced around the periphery of the area.

* * * * *